Nov. 18, 1969  A. R. BAHLKE ET AL  3,479,065
COUPLING DEVICE FOR FLUID CONDUCTING CONDUITS
Filed Jan. 3, 1968  3 Sheets-Sheet 1
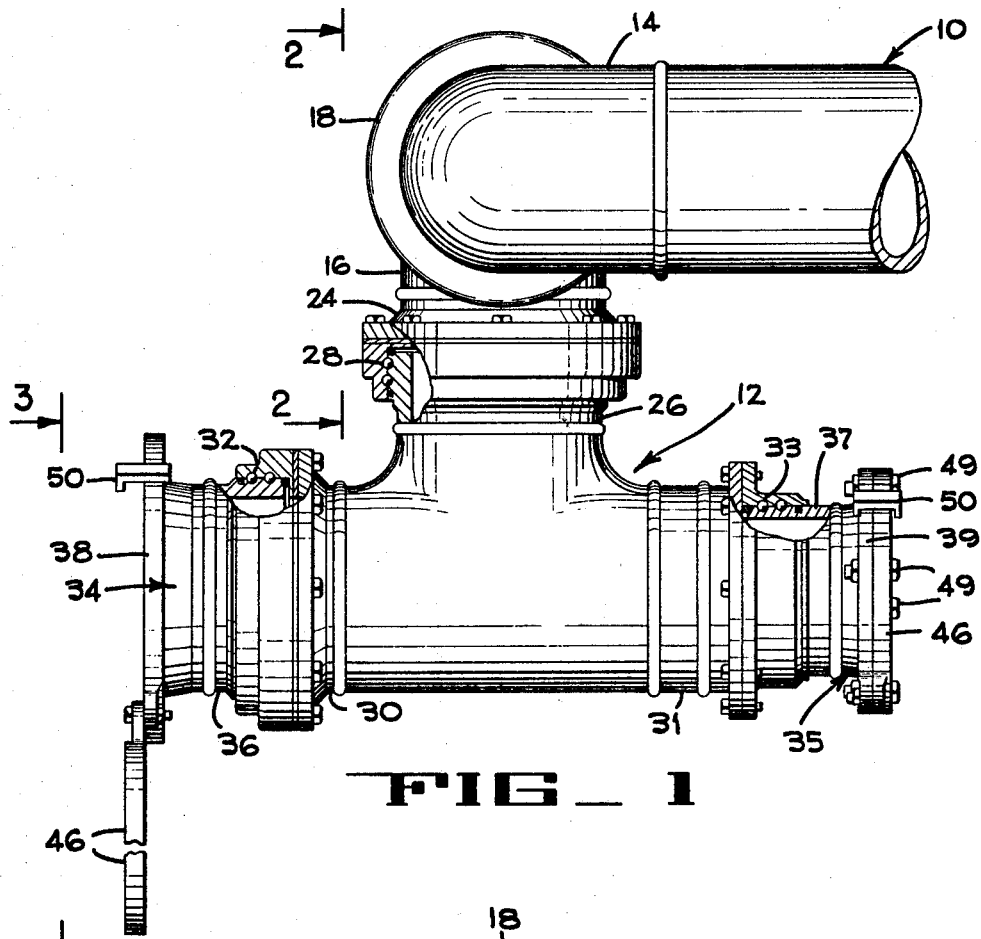
FIG_1
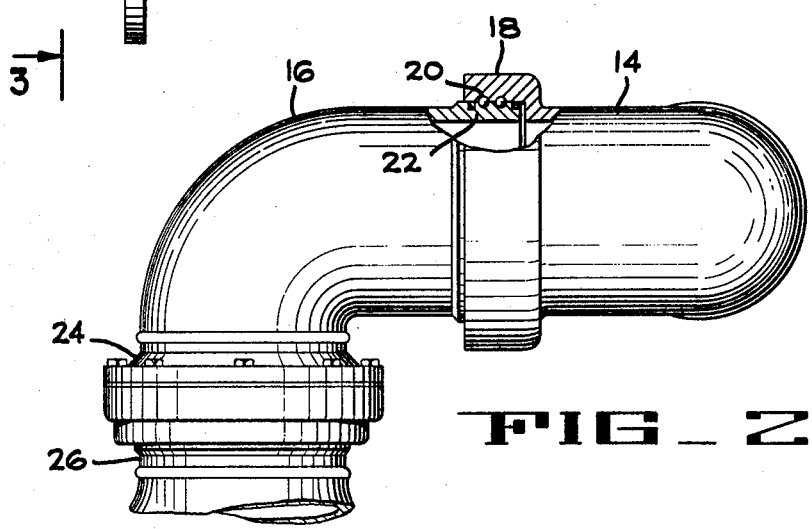
FIG_2
INVENTORS
ALLAN R. BAHLKE
GEORGE W. BLOOMQUIST
BY F. W. Anderson
C. E. Tripp
ATTORNEYS

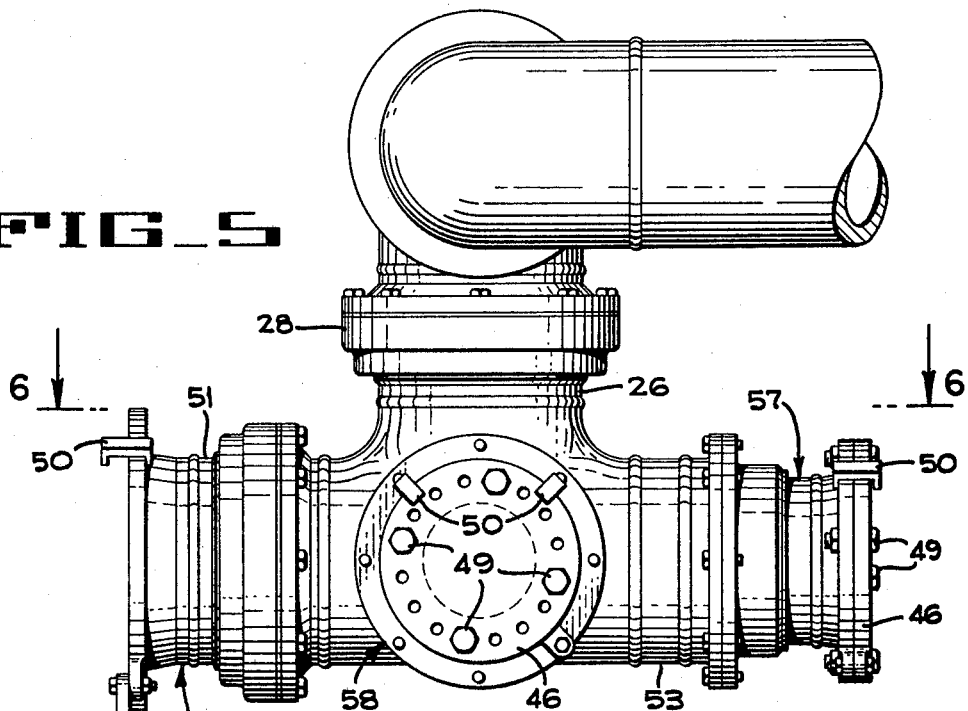
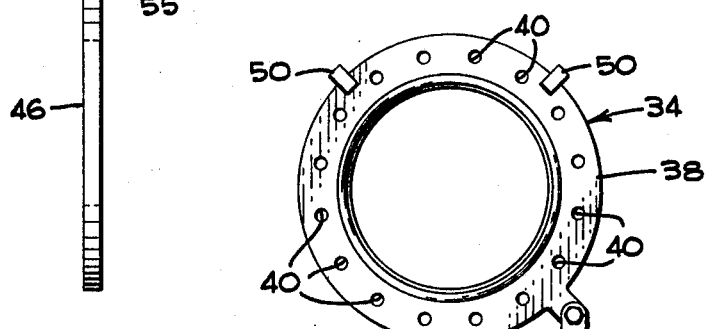
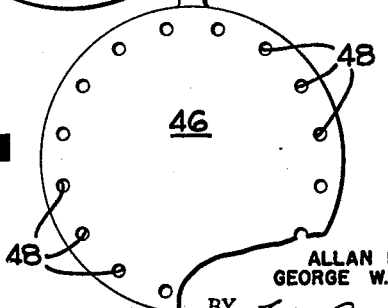

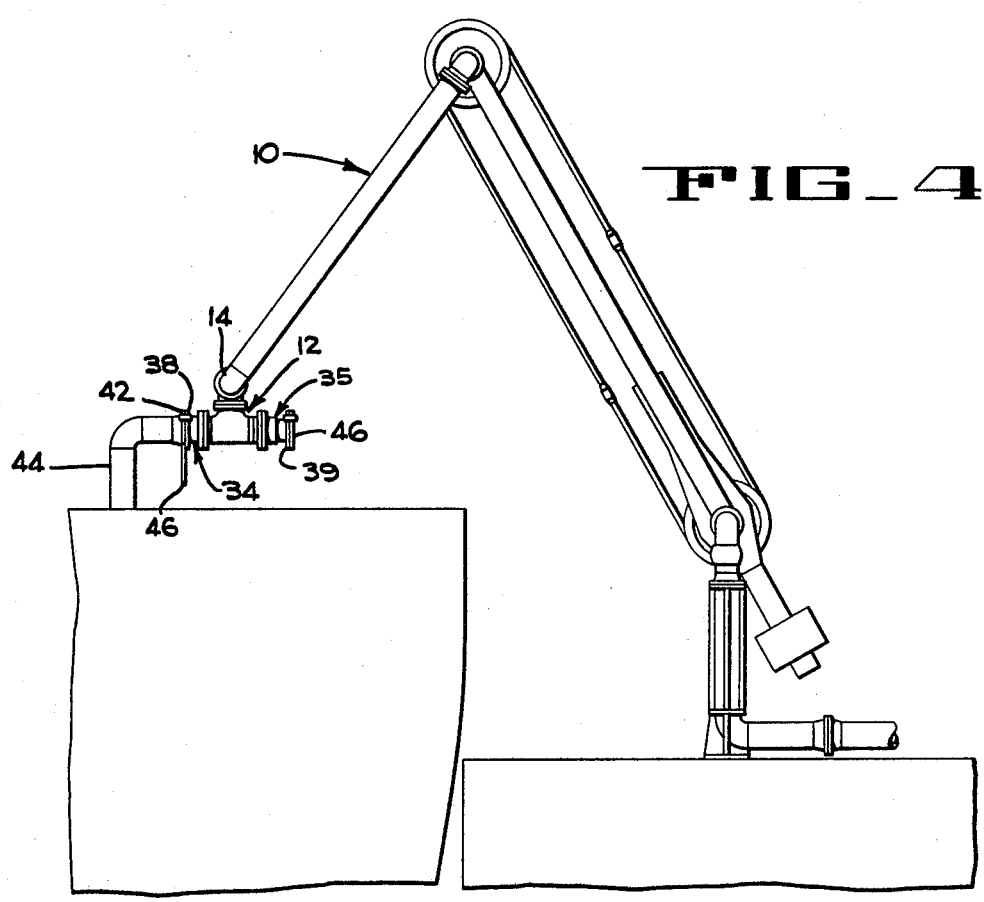
FIG_4
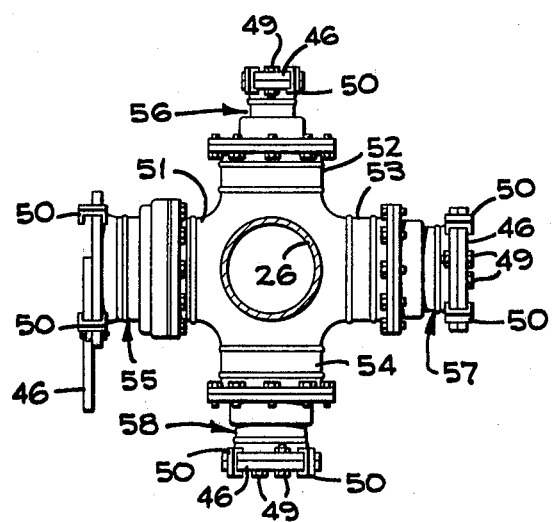
FIG_6

United States Patent Office 3,479,065
Patented Nov. 18, 1969

3,479,065
COUPLING DEVICE FOR FLUID
CONDUCTING CONDUITS
Allan R. Bahlke, Fullerton, and George W. Bloomquist,
Long Beach, Calif., assignors to FMC Corporation, San
Jose, Calif., a corporation of Delaware
Filed Jan. 3, 1968, Ser. No. 695,374
Int. Cl. F16l 39/00, 41/00
U.S. Cl. 285—151     5 Claims

ABSTRACT OF THE DISCLOSURE

A coupling device for conduits, which makes it possible to connect a conduit to other conduits having terminal flanges of a different size, without need to interpose adaptors, and which comprises a first conduit section, a second conduit section with one of its ends disposed coaxially with and adjacent to one end of said first conduit section, coacting means on the adjacent ends of said first and second conduit sections to establish a swivel connection therebetween, a plurality of conduits branching off radially from said second conduit section, annular connection flange structures of different diametrical sizes arranged adjacent the open ends of said branch conduits coaxially therewith, and coacting means on the open ends of said branch conduits and their respective flange structures to establish swivel connections therebetween. Pivotally supported from the edge of each of said flange structures is a closure disc which may be swung from a position wherein it is completely withdrawn from the central opening of the annular flange structure to a position wherein it completely covers said central opening.

Background of the invention

The present invention relates to couplings for releasably connecting fluid-conducting conduits, such as the loading arms of tanks or reservoirs on docks or railroad loading ramps and the fluid receiving conduits with which tank cars, barges, trucks and other vehicles may be equipped. Such couplings are usually formed by flexible hoses or a series of swivel-jointed pipe sections that are suitably connected to, or form part of one of the conduits and these hoses or pipe sections are provided with terminal flanges for connection to complementary flanges arranged around the open ends of the conduits to which they are to be connected.

The problem with arrangements of this type is that the open ends of fluid conducting conduits and their terminal flanges vary in size and that it may become necessary in practice to connect fluid conducting conduits having terminal flanges of different sizes with each other. On such occasions it has been the practice to interpose between the terminal flanges of the conduits tubular adaptors known as "spools." Such spools are often quite heavy and their installation takes significantly more time and effort than the connection of conduits having terminal flanges of equal diameter. Also, because of the increased moment load which these spools place upon the terminal flanges of the conduits, they may endanger the conduits and their terminal flanges so that it is often necessary to strengthen both the conduits and the flanges to avoid deformation and breakage of one or the others, all of which is cumbersome and costly.

Summary of the invention

It is an object of the invention to provide a coupling device that makes it possible to connect conduits of different size directly with each other, without the use of adaptors.

It is another object of the invention to provide a conduit with a coupling device by means of which it may be connected directly to any one of a number of conduits having terminal flanges of the same or a different diameter.

Brief description of the drawings

These and other objects of the present invention will be apparent from the following description of the accompanying drawings which illustrate certain preferred embodiments thereof and wherein:

FIGURE 1 is a side elevation of a portion of a tubular loading arm provided with the coupling device of the invention; with parts broken away to expose structure underneath;

FIGURE 2 is a fragmentary end view of the coupling device illustrated in FIGURE 1 viewed in the direction of the arrows 2—2 shown in FIGURE 1;

FIGURE 3 is a detail view showing a part of the coupling device of the invention as viewed in the direction of the arrows 3—3 in FIGURE 1;

FIGURE 4 is a fragmentary diagrammatic side elevation of a barge and a dock installation showing the coupling device of the invention in practical use;

FIGURE 5 is a side elevation of a modified embodiment of the invention; and

FIGURE 6 is a section taken along line 6—6 of FIGURE 5 and viewed in the direction of the arrows associated with said line.

Description of the preferred embodiments

In FIGURES 1 and 4 the reference number 10 identifies a loading arm of the type used on dock installations (FIG. 4). This loading arm is provided with the coupling device of the invention which is collectively identified by the reference numeral 12. Said device comprises a tubular elbow 14, shown as bent around a vertical axis, that is rigidly secured to the end of loading arm 10. Connected to the free end of elbow 14 is one end of another tubular elbow 16 shown as bent around a horizontal axis, the connection being such that elbow 16 swivels relative to elbow 14 about the common horizontal axis of their adjacent ends. For this purpose any conventional swivel connection may be employed. In the exemplary embodiment of the invention shown in FIGURES 1 and 2, the free end of elbow 14 is radially expanded and the inner side wall of the resultant cup 18 constitutes the outer race of a ball bearing 20, while the adjacent end 22 of the second elbow 16 forms the inner race of said bearing. Pivotally supported from the opposite end 24 of the second elbow 16 in coaxial alignment with said elbow end is a short straight tube section 26. The swivel connection between the downwardly facing end 24 of the second elbow 16 and the upper end of the tube section 26 may be of the same, or a similar construction as the above described swivel connection, and is illustrated by way of example at 28 in FIGURE 1.

Tube section 26 forms the stem portion of an inverted T in that two short, horizontally disposed tube portions 30 and 31 are integral therewith and branch off radially therefrom at diametrically opposite points thereof; and pivotally supported from the ends of said tube portions 30 and 31 by suitable swivel connections 32 and 33 (FIG. 1) of the same, or a similar construction as previously described, are annular flange structures 34 and 35 respectively, which are of different diametrical size. Each of said flange structures 34 and 35 comprises a short tubular base member 36 and 37, respectively, the outer end of which carries an annular flange 38 and 39 respectively. Both flanges are provided in the conventional manner with a plurality of angularly equi-spaced holes 40 (FIG. 3) through which they may be bolted to a complementary flange 42 (FIG. 4) with which a fluid receiving conduit 44 may be provided. Suitable U-shaped stops 50, as shown in FIGURES 1 and 3, may be employed to register the flanges 38, 39 with the complementary flange 42 during the bolting operation, thus helping the operator to align the apertures in the flanges.

Means are provided to close the open center areas of both flange structures 34 and 35 in a fluid tight manner. For this purpose a closure disc or lid 46 is pivotally supported from the edge of each terminal flange 38, 39 in such a manner that it may be swung from a position wherein it is completely withdrawn from its respective flange and thus leaves one of the branch tubes 30 or 31 open (FIGS. 1 and 3) to a position wherein it covers flange 38 or 39 and thus completely closes the passage which the flange encircles. In order that the lid may be dependably secured in its passage-closing position, its peripheral area is provided with a plurality of angularly equispaced holes 48 through which bolts 49 may be inserted (FIG. 1) to engage matching holes 40 in the flange 38 or 39.

A second embodiment of the coupling of the present invention is illustrated in FIGURES 5 and 6. Parts of the embodiment of FIGURES 5 and 6 that are identical in construction, but not necessarily in size, are identified by the same reference numerals as those assigned to the corresponding parts of the embodiment of FIGURES 1–4.

The embodiment of the invention illustrated in FIGURES 5 and 6 differs from the embodiment illustrated in FIGURES 1 and 2 in that its central conduit section 26 has four branch conduits 51, 52, 53 and 54 extending radially from its lower end in the manner of a short-armed cross, and each branch conduit pivotally supports at its outer end a terminal flange structure 55, 56, 57 and 58, respectively, of different diametrical size. Hence the embodiment of the invention illustrated in FIGURES 5 and 6 provides the possibility of connecting the loading arm 10 to four differently sized fluid receiving conduits.

When a loading arm is provided with the described coupling device of the invention, it is possible to connect it to a variety of fluid receiving conduits having differently sized terminal flanges, without the need to handle heavy "spools" or like adaptors. It is merely necessary to turn the conduit section 26, as the case may be, on the swivel 28 until the appropriate one of the flanges is brought into the proper position vis-a-vis the terminal flange 42 of the fluid receiving conduit 44 which is to be serviced at the moment (FIG. 4). It is then a simple matter easily handled by a single operator to connect the proper flange of the coupling device of the invention to the terminal flange of the fluid-receiving conduit. Care must, of course, be taken that the branch conduits and flange structures not in use, be properly closed by bolting their lids 46 over the terminal flanges of the unused branch conduits before the pumping operations are commenced.

The coupling device of my invention is of simple construction, it is easy to handle by a single operator. It makes it possible to connect a loading arm to conduits provided with differently sized terminal flanges, without having to resort to spools and like adaptors. It constitutes a saving in both the structural cost of the fluid transmittal installation and in the cost of he labor required to handle the installation.

While the embodiments of the invention illustrated in the accompanying drawings provide a selection of two or four differently sized connection flanges, it will be understood by those skilled in the art that the coupling device of our invention may be constructed to provide a selection of three, five and even more differently sized connection flanges. It is merely necessary to change the number of the conduits branching off from the center conduit 26, and to support from their open ends connection flange structures of different diametrical sizes.

Having completed a detailed description of the invention so that those skilled in the art could practice the same, I claim:

1. A coupling device for connecting a conduit to conduits having differently sized connection flanges comprising a first conduit section, a second conduit section arranged coaxially with one end of said first conduit section, coacting means on the adjacent ends of said conduit sections for establishing a swivel connection between said conduit ends, a plurality of branch conduits communicating with and extending radially from said second conduit section, connection flange structures of different diameters arranged adjacent and coaxially with the free ends of said branch conduits, and coacting means on said flange structures and the free ends of their respective branch conduits for establishing swivel connections between said flange structures and said free ends.

2. A coupling device according to claim 1 including two of said branch conduits and wherein said second conduit section and said branch conduits are arranged in the form of an inverted T.

3. A coupling device according to claim 1 including four branch conduits arranged in the manner of a cross.

4. A coupling device according to claim 1 wherein said first conduit section is an elbow conduit and including a second elbow conduit with one of its ends arranged adjacent the free end of said first conduit section, and coacting means on the adjacent ends of said elbows for establishing a swivel connection between said adjacent elbow ends.

5. A universally adjustable tubular coupling device comprising a first elbow conduit, a second elbow conduit arranged with one of its ends adjacent to and coaxially with one end of said first elbow conduit, coacting means on the adjacent ends of said first and second elbow conduits establishing a swivel connection between said ends, a first conduit section arranged adjacent to and coaxially with the other end of said second elbow conduit, coacting means on the adjacent ends of said second elbow conduit and said first conduit section for establishing a swivel joint between said ends, a plurality of branch conduits extending radially from said first conduit section, connection flange structures of different diameters arranged adjacent the open ends of said branch conduits, and coacting means on said flange structures and the open ends of their respective branch conduits for establishing swivel connections between said flange structures and said open ends.

References Cited

UNITED STATES PATENTS

| | | | |
|---|---|---|---|
| 1,804,290 | 5/1931 | Tschappat | 285—12 |
| 2,587,938 | 3/1952 | Warren | 285—168 X |
| 2,703,720 | 3/1955 | Warren | 285—276 |
| 3,014,494 | 12/1961 | Scott et al. | 285—168 X |
| 3,073,343 | 1/1963 | Mowell et al. | 137—615 |

FOREIGN PATENTS

| | | |
|---|---|---|
| 1,241,933 | 8/1958 | France. |
| 1,375,771 | 9/1964 | France. |

DAVID J. WILLIAMOWSKY, Primary Examiner

D. W. AROLA, Assistant Examiner

U.S. Cl. X.R.

285—168, 177, 181, 276; 141—367, 387